Jan. 13, 1925.
G. A. ANDERSON
CAR TRUCK
Filed Aug. 2, 1922
1,522,935
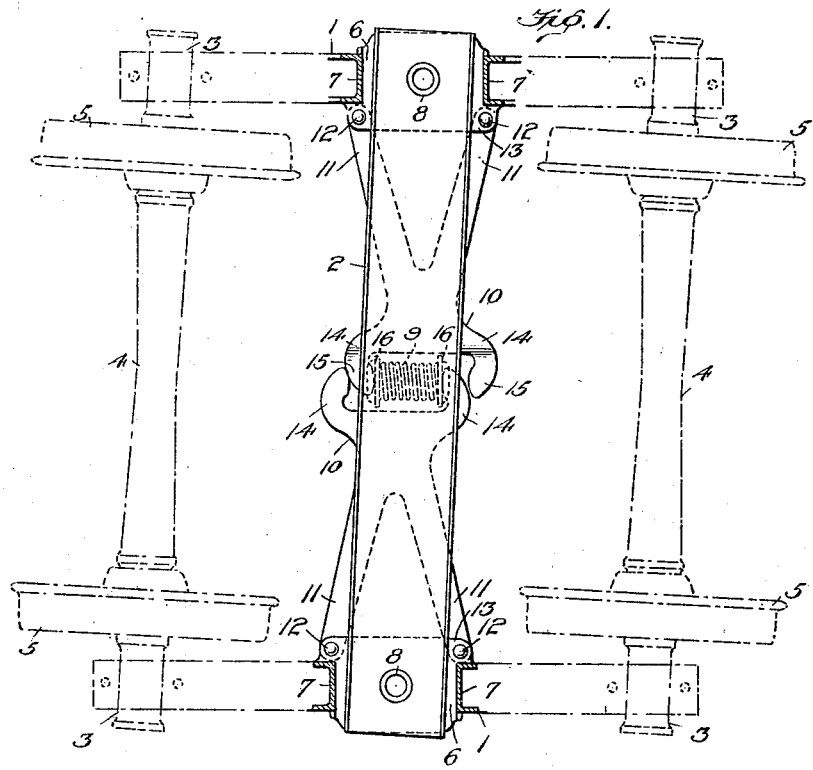
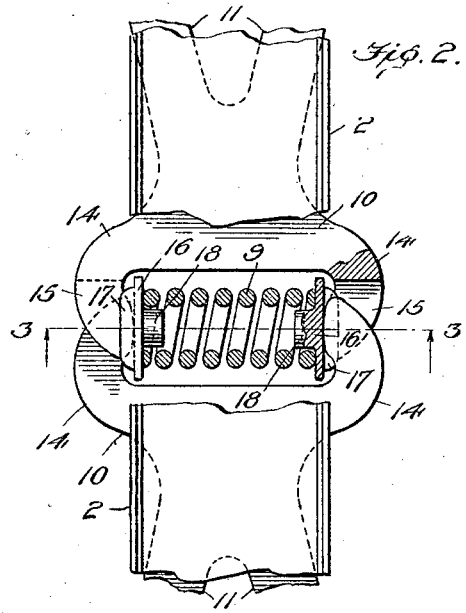
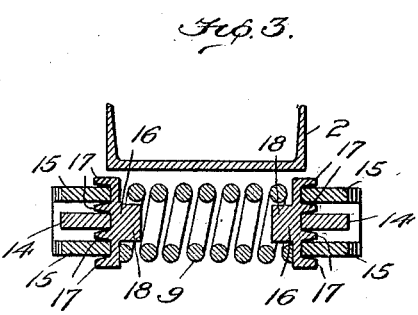
Inventor
Gustaf A. Anderson
By his Attorney Patented Jan. 13, 1925.

1,522,935

UNITED STATES PATENT OFFICE.

GUSTAF A. ANDERSON, OF BALTIMORE, MARYLAND, ASSIGNOR TO THE T. H. SYMINGTON COMPANY, OF NEW YORK, N. Y., A CORPORATION OF DELAWARE.

CAR TRUCK.

Application filed August 2, 1922. Serial No. 579,275.

*To all whom it may concern:*

Be it known that I, GUSTAF A. ANDERSON, a citizen of the United States, residing at Baltimore, in the State of Maryland, have invented certain new and useful Improvements in Car Trucks; and I do hereby declare the following to be a full, clear, and exact description of the invention such as will enable others skilled in the art to which it appertains to make and use the same.

My invention relates to car trucks and more particularly to a type of truck wherein the side frame members on opposite sides of the truck are connected in a manner permitting them to execute a yieldingly resisted relative movement longitudinally of the truck thereby reducing the shocks and strains transmitted to the structure incident to its passage around curves, over switch points or because of irregularities in the track or the truck wheels.

The principal object of the invention, generally stated, is to provide a strong, compact and reliable mechanism for yieldingly resisting displacement movement of the side frames of a flexible car truck from their normal positions and for restoring said parts to square relation upon cessation of the distorting force. To this end I provide a centrally located yieldable device interposed between cooperating ends of inwardly extending members carried by the side frame members, said yieldable device involving a spring positioned between said inwardly extending members under initial compression and adapted to be energized from either end thereof upon displacement of either or both of the side frame members from normal position.

Another object of the invention is to provide in combination a truck having side frame members movably and transversely connected to each other and inwardly extending members having interassociated bifurcated portions, said bifurcated portions having jaws cooperatively associated with flanged washers or follower members between which latter is positioned and retained the spring device.

A further object of my invention is to provide a car truck having side frames pivotally connected transversely of the truck by a spring plank, a yieldable device for resisting displacement movement of the side frames from normal position, and means movable with the side frames adapted to engage the yieldable device, said means also serving to support and retain said yieldable device beneath the spring plank.

There are other advantageous features of the invention which reside in the particular form, simple construction, arrangement and combination of parts all as will hereinafter appear.

In the drawings illustrating the invention and in which correspondnig reference characters designate similar parts in the several views:

Figure 1 is a view partly in plan and partly in section of my invention applied to a car truck, shown conventionally in dotted lines, the bolster such as is ordinarily employed in flexible car trucks being omitted and the parts being illustrated in the angular relations they assume when passing around a sharp curve.

Figure 2 is a detail enlarged plan view of the yieldable device associated with the inner cooperating ends of the members carried by and projecting inwardly from the side frames, a portion of said view being broken away and another portion thereof being shown in section.

Figure 3 is a central longitudinal vertical sectional view on the line 3—3 of Figure 2.

In the embodiment of my invention illustrated in the drawing, the spaced side frame members 1 of the truck are movably connected by transversely extending means 2 preferably constituting a truck spring plank. Each side frame is provided at its opposite ends with journal boxes (not shown) into which extend the journal ends 3 of axles 4 carrying the truck wheels 5.

The member 2 by which the side frames are connected across the truck, preferably extends into the bolster opening 6 between the columns 7 of the side frames, sufficient space being provided between said columns to permit the cross connecting means to change its angular relation to the side frame members when the latter are displaced from normal position. When, as illustrated in the drawings, the spring plank 2 performs the function of a cross connecting means, ample clearance should be similarly provided between the columns 7 and the sides of the bolster in order that the latter may freely change its angular relation to the side frame members when the latter execute a relative longitudinal movement.

The spring plank 2 is pivotally connected at its ends to the adjacent side frame members, each of the latter being for this purpose formed with an upwardly extending pivot boss 8 which projects into a correspondingly shaped aperture or pivot bearing in the spring plank.

The means for yieldingly resisting longitudinal displacement of the side frame members from normal position includes a spring 9 perferably arranged centrally and longitudinally of the truck on a center line passing therethrough. The spring is interposed between the bifurcated ends of inwardly extending members 10, each of said members having divergent arm portions 11 suitably connected by rivets 12 to inwardly projecting portions or flanges 13 formed on the side frame members. The members 10 are preferably fixed rigidly with relation to an adjacent side frame and are adapted to move vertically upon displacement from and when returned to normal position. The respective inner ends of the members 10 are vertically bifurcated, the oppositely projecting jaws 14 of the members being adapted to normally overlie each other, as shown. The oppositely disposed jaws 14 on one of the members 10 are horizontally divided, as shown, the forked portions 15 thereof extending above and below the intervening jaws 14 provided on the adjacent member 10. The associated jaws overlie one another at each end of the spring, washers or followers 16 being preferably interposed between the ends of the spring and the adjacent jaws of the members 10.

Each follower is provided with a plurality of flanges 17 between which are arranged the superimposed jaw portions of the associated members 10, said jaws seating against the body portion of the follower, as best shown in Figure 3. A projection 18 is preferably formed on each washer, said projection entering the spring and serving to effectively retain the same in position. The spring is assembled under an initial compression and when interposed between the followers and associated jaw portions of the members 10 any tendency of the spring to drop or work out of place is prevented by the projection 18, and the follower is effectively held in position by the jaw portions of the members 10 entering and seating between the flanges 17.

Upon displacement of a side frame from normal position the tendency thereof to swing around the pivot boss is resisted by the spring 9 and the other side frame, one jaw portion of the member 10 carried by the side frame acting as an abutment between which and the moving jaw portion of the opposite member 10 carried by the displaced side frame, the said spring 9 is compressed, as shown in Figure 1. Movement of the opposite side frame from normal position is similarly resisted but in a reverse manner, the spring being compressed from the opposite end thereof, as will be understood.

When a truck constructed in accordance with my present invention is subjected to a force causing one or both side frames to move relatively from normal position, the spring 9 arranged between the members 10 carried by said side frames will be compressed as long as the distorting force overcomes the predetermined initial compression of said spring. The amount of compression of the spring will, of course, be dependent upon the intensity of the force operating to displace the side frames from normal position. It will be apparent that immediately upon diminution of the distorting force the side frames and the inwardly extending members 10 will move toward normal position, and that they will resume such normal position when the distorting force disappears.

I claim:

1. In a car truck, the combination with side frame members, of means pivotally connecting said side frame members, inwardly extending members carried by said side frame members, each of said inwardly extending members being provided with adjacent inner end portions, and yieldable means interposed between said inner end portions, said yieldable means being located longitudinally of the truck and adapted to be energized upon displacement movement of a side frame member from normal position.

2. In a car truck, the combination with side frame members, of means pivotally connecting said side frame members, inwardly extending members provided on said side frame members and having jaw portions at their inner ends, and a spring device interposed between said jaw portions and operable from either end by opposite jaws of either of said inwardly extending members for resisting displacement of the side frame members from normal position.

3. In a car truck, the combination with side frame members, of a spring plank connecting said side frame members, a spring arranged intermediate the ends of said spring plank for resisting displacement of the side frames from normal position, inwardly extending members having inner end portions engaging the opposite ends of said spring, and means associated with said inner end portions and the ends of said spring for retaining the latter in position.

4. In a car truck, the combination with side frame members, of a spring plank connecting said side frame members, a spring arranged intermediate the ends of said spring plank for resisting displacement of the side frames from normal position, said spring being assembled under initial compression, and members carried by the side frame members having portions engaging opposite ends of said spring longitudinally of the truck, the opposite end portions on adjacent members acting to energize the spring upon displacement of the side frames from normal position.

5. In a car truck, the combination with side frame members, of means pivotally connecting said side frame members, a yieldable device involving a spring arranged intermediate the ends of said connecting means for resisting displacement movement of the side frames from normal position, and inwardly extending members having portions engaging the opposite ends of said yieldable device, opposite portions on adjacent members acting to energize the spring upon displacement of a side frame from normal position.

6. In a car truck, the combination with side frame members, of means pivotally connecting said side frame members, a yieldable device involving a spring arranged intermediate the ends of said connecting means for resisting displacement movement of the side frames from normal position, inwardly extending bifurcated members having jaws adapted to normally overlie each other and movable longitudinally of the truck, said spring mounted between the respective bifurcated portions of said members, and a follower interposed between each end of said spring and the adjacent jaws of said bifurcated portions.

7. In a car truck, the combination with side frame members, of means pivotally connecting said side frame members, a yieldable device involving a spring arranged intermediate the ends of said connecting means for resisting displacement movement of the side frames from normal position, inwardly extending members having vertically bifurcated inner ends formed with overlying jaws, said spring arranged between said bifurcated portions of said members, said spring being interposed under initial compression, and a flanged washer arranged between each end of said spring and the adjacent overlying jaws.

In testimony whereof I affix my signature.

GUSTAF A. ANDERSON.